United States Patent

[11] 3,582,918

[72] Inventor Jerome J. Tiemann
Schenectady, N.Y.
[21] Appl. No. 697,400
[22] Filed Jan. 12, 1968
[45] Patented June 1, 1971
[73] Assignee General Electric Company

[54] MAGNETIC HEAD WITH DISSIMILAR POLE PIECES
11 Claims, 13 Drawing Figs.

[52] U.S. Cl. ........ 340/174.1F, 179/100.2C
[51] Int. Cl. ........ G11b 5/02, G11b 5/44
[50] Field of Search ........ 179/100.2 CB, 100.2 C; 346/74 MC; 340/174.1 F

[56] References Cited
UNITED STATES PATENTS

| | | | |
|---|---|---|---|
| 3,013,123 | 12/1961 | Camras | 179/100.2 |
| 2,678,972 | 5/1954 | Spears | 179/100.2 |
| 2,822,427 | 2/1958 | Atkinson et al. | 179/100.2 |
| 3,060,279 | 10/1962 | Harrison | 179/100.2 |
| 3,105,965 | 10/1963 | Joannou | 179/100.2 |
| 3,114,011 | 12/1963 | Shirzkura | 179/100.2 |
| 3,354,540 | 11/1967 | Duinker | 179/100.2 |

FOREIGN PATENTS

| | | | |
|---|---|---|---|
| 881,115 | 6/1953 | Germany | 179/100.2 |
| 1,059,196 | 9/1954 | Germany | 179/100.2 |
| 706,267 | 3/1954 | Great Britain | 179/100.2 |
| 963,219 | 6/1964 | Great Britain | 179/100.2 |

OTHER REFERENCES

" Long-Wavelength Response of Magnetic Reproducing Heads," Fritzsch IEEE Transactions on Audio & Electroacoustics Vol. Au 16, No. 4, Dec. 68

*Primary Examiner*—Stanley M. Urynowicz, Jr.
*Assistant Examiner*—Vincent P. Canney
*Attorneys*—Richard R. Brainard, Marvin Snyder, Paul A. Frank, Frank L. Neuhauser, Melvin M. Goldenberg and Oscar B. Waddell

ABSTRACT: The corner of a magnetic recording head at one edge of the gap therein is modified by being set back, rounded off, etc., to produce a slowly varying response when a magnetic flux reversal in a magnetic recording medium moving in relation to the head passes the modified corner. A fast response is thus produced only when a flux reversal passes the corner at the other gap edge, obviating nulls in frequency response and yielding the benefits of a large gap without sacrificing resolution. Linear processing of waveforms produced by the head provides a sharp output pulse in response to each passing flux reversal.

Inventor:
Jerome J. Tiemann,
by Marvin Snyder
His Attorney.

Inventor:
Jerome J. Tiemann,
by Marvin Snyder
His Attorney.

MAGNETIC HEAD WITH DISSIMILAR POLE PIECES

This invention relates to magnetic transducers, and more particularly to magnetic recording read/write heads which are capable of high playback resolution.

Resolution of a magnetic recording head is an important factor in performance of the head, since the amount of information that can be retrieved from a given amount of recording surface depends on this parameter. Accordingly, any improvement in resolution of a magnetic tape recorder head would permit improved frequency response at constant tape speed or, at a lower tape speed, would permit a longer playback time for the same length of tape. Similarly, in digital recording, an improvement in head resolution would permit an increase in the number of stored characters per unit length of data track and, if the frequency response of the head were improved simultaneously, an increase in the maximum rate of data transfer could be obtained.

In prior magnetic transducer heads, the resolution of a recording or playback head has been dependent upon length of a nonmagnetic gap in the head. Improved resolution can be obtained by decreasing the gap length. Shorter gap length, however, requires the other dimensions of the magnetic core to be changed as well; otherwise magnetic coupling between the pickup coil and the magnetic medium decreases. Furthermore, because head inductance generally increases as the gap is shortened, frequency response may be severely degraded when gap length is reduced below a particular size. Thus, optimum gap length has heretofore been selected so as to compromise between resolution and frequency response. Moreover, when gap length is sufficiently shortened, the external magnetic field produced during writing is much weaker than for a longer gap, requiring employment of separate magnetic circuits for reading and writing. In other types of magnetic heads, head resolution has been sacrificed to a certain extent in order to achieve optimum overall performance.

The present invention concerns magnetic transducer heads wherein head resolution is much finer than the length of the gap; in fact, gap length is not a factor in determining resolution, so that resolution of a head having a gap of conventional length can be made much finer than that of a head with the narrowest practical head gap. This makes it possible to achieve a low value of head inductance and a strong recording field, while at the same time achieving extremely fine resolution. The improvements thus effectuated are especially significant in contact recording systems wherein the transducer head is positioned so closely to the recording medium that it is substantially in contact therewith.

Accordingly, one object of the invention is to provide a magnetic transducer head having very high resolution which is substantially independent of gap length.

Another object is to provide a magnetic recording head having a low value of head inductance and a strong recording filed while maintaining extremely fine resolution.

Another object is to provide a magnetic transducer head having a sharp discontinuity in its magnetic properties at only one edge of a nonmagnetic gap therein so that rapid changes in magnetic flux threading the head occur n response to magnetic flux reversals passing the head only in the vicinity of the single discontinuity.

Another object is to provide linear signal processing apparatus for producing a single, sharp output pulse in response to each magnetic flux reversal moving past a high resolution magnetic recording head.

Another object is to provide a method of facilitating precise fabrication of magnetic transducer heads having unsymmetrical gap geometry.

Briefly, in accordance with a preferred embodiment of the invention, a magnetic transducer head for use with a magnetic recording medium is provided. The transducer head comprises two magnetic members of high permeability separated by a nonmagnetic gap and integrally joined to a magnetic crosspiece of high permeability. The two magnetic members are situated in unequal proximity to the recording medium so that in these members the rate of change of magnetic flux with respect to time, or time dependence of the magnetic flux, at the time a flux reversal is passing one side of the gap is distinguishably different from the corresponding time dependence when the flux reversal is passing the other side of the gap. Thus, since the magnetic flux lines from the flux reversal region spread out as they leave the medium, lowering the flux density as distance from the medium increases, the time dependence of the magnetic flux in the two magnetic members will be much more rapidly changing when the flux reversal is at its closest point to the edge of the closer member than when the flux reversal is at its closest point to the edge of the more distant member. A coil of wire is wound about at least a portion of the magnetic material of the transducer head so as to provide electrical coupling to the head, and electrical filter apparatus may be coupled to the coil in order to produce the desired output signal waveform.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figures 1A, 1B, 1C, 2, 3, 4, 5, 6:
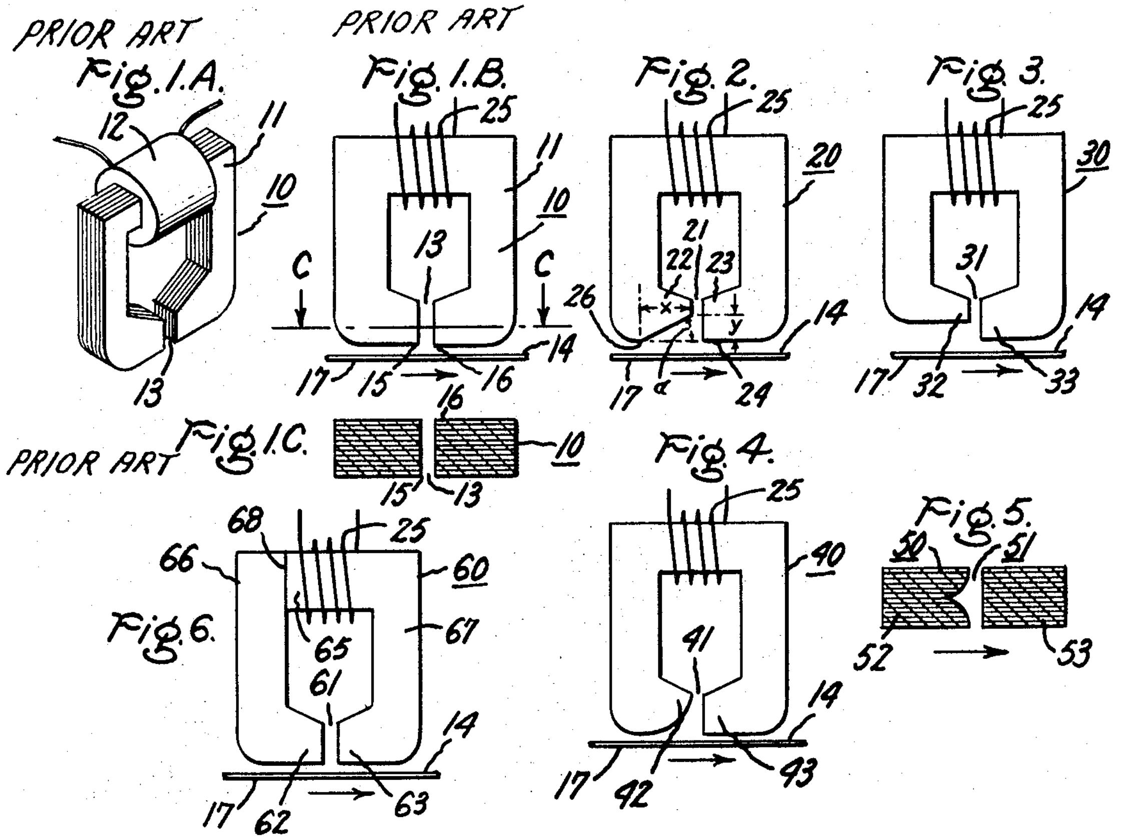
FIG. 1A is an isometric view of a conventional magnetic transducer head.
FIG. 1B is a side view of the magnetic transducer head of FIG. 1A and its relation to the recording medium associated therewith, with the coil shown schematically.
FIG. 1C is a view of the head of FIG. 1B, taken along line *cc*.
FIG. 2 is a side view of one embodiment of the magnetic transducer head of the invention.
FIG. 3 is a side view of a second embodiment of the magnetic transducer head of the invention.
FIG. 4 is a side view of a third embodiment of the magnetic transducer head of the invention.
FIG. 5 is a sectional view of a fourth embodiment of the magnetic transducer head of the invention which, in side view, is identical to the embodiment of FIG. 1B, and is viewed along a line comparable to line *cc* of FIG. 1B.
FIG. 6 is a side view of a fifth embodiment of the magnetic transducer head of the invention.

FIG. 1A illustrates a typical conventional magnetic transducer head 10 comprised of a stack of laminations 11 and a coil of wire 12 wound thereon. A nonmagnetic gap 13 exists in the otherwise continuous magnetic path formed by the stack of laminations 11. FIG. 1B illustrates the laminations of head 10 in side view, with coil 12 shown schematically. A view of head 10, taken along line *cc* in FIG. 1B, is illustrated in FIG. 1C. The upper surface 14 of a recording medium 17 is illustrated in FIG. 1B so as to show the relationship between head 10 and recording medium 17. The arrow beneath recording medium 17 indicates the direction of travel of the recording medium with respect to head 10.

As is well known, there exists a maximum limitation on the length of the gap for a magnetic head of conventional design. If the length of gap 13 should approach the recorded wavelength, the output voltage produced by coil 12 will approach zero. This is because the magnetic field of the recording medium establishes like magnetic poles on either side of gap 13, so that no net magnetic flux exists across the extremities of head 10. Thus, no magnetic flux paths are established through the head, resulting in no net flux linking coil 12. Therefore, the resolution of the conventional magnetic pickup head is limited by the length of gap 13.

FIG. 2 is a side view of a magnetic head 20 comprised of laminations of different shape than those which make up head 10 in FIGS. 1A and 1B, together with an output coil 25 wound thereon. The laminations of head 20 are shaped so that the extremities of pole pieces 22 and 23 on either side of a nonmagnetic gap 21 are of different configurations. Thus, while pole piece 23, the trailing pole piece with respect to the relative motion between head 20 and medium 17, is of the same configuration at the trailing pole piece of the conventional head illustrated in FIG. 1B, the leading pole piece 22 is of different configuration. This is achieved by sloping the surface of pole piece 22 which is adjacent surface 14 of recording medium 17 at an angle with surface 14, so as to situate one corner of the gap farther away from surface 14 than the other corner. The sloped surface establishes a relatively gradual interface between nonmagnetic gap 21 and pole piece 22, thereby avoiding existence of a substantial discontinuity in the magnetic properties of the head at this interface, and facilitates lapping to a high degree of precision, as described, infra.

The effect of the sloped surface of pole piece 22, which results in an interface with gap 21 such that a portion of this interface is skewed with respect to the interface of pole piece 23 with gap 21, may be understood when head 20 is compared to conventional head 10 of FIG. 1B. Each of corners 15 and 16 of head 10 at the edge of gap 13 represents a substantially equal discontinuity in the magnetic properties of the transducer. On the other hand, only corner 24 in head 20 of FIG. 2 is effectively a sharp discontinuity in this transducer; the other discontinuity has been moved away from the recording medium. In this way, rapid changes in the magnetic field pattern due to this other discontinuity are eliminated. Effectively, therefore, the magnetic flux pattern created by recording medium 17 as it moves in relation to transducer 20 causes abrupt changes in the magnetic field within the transducer, which arise from the leading edge of trailing pole piece 23 due to the close proximity of its sharp corner with the recording medium. Although the area of pole piece 22 which forms one end of gap 21 is less than the area of pole piece 23 which forms the other end of the gap, it nevertheless is sufficient to permit passage of magnetic flux through coil 25 and to permit efficient generation of magnetic field for writing on the medium. Yet, changes in the magnetic field within the transducer are prevented substantially from arising at leading pole piece 22 due to the geometric configuration of the leading pole piece; that is, the configuration of pole piece 22 permits only gradual changes in magnetic state of the transducer to occur as the result of passage of a magnetic flux reversal in this vicinity. Accordingly, transducer 20 responds in an unsymmetrical manner so that, when a flux reversal in recording medium 17 passes the corner of pole piece 22 in the vicinity of gap 21, only a gradual change in field within the transducer occurs, while a much more rapid change in field occurs when the flux reversal passes the corner of pole piece 23. The net effect upon the transducer is that flux paths are established therein in response to magnetic fields sensed substantially by trailing pole piece 23 alone. Therefore, the signal induced in winding 25 wound around the stack of laminations comprising transducer head 20 is related to the magnetization sensed by the corner of pole piece 23 and is independent of the length of gap 21.

Because of the precision with which transducer heads must be fabricated, it is necessary to maintain precise control over the gap and pole piece configurations thereof. By controlling the angle at which the surface of pole piece 22 adjacent surface 14 of recording medium 17 slants away from surface 14, the fabrication process for transducer head 20 is greatly simplified. Thus, in the finishing operation, which often involves lapping of the surface of the transducer head adjacent the surface of the recording medium, the spacing between pole piece 22 and surface 14 may be readily determined to a high degree of precision by noting the intersection 26 of the sloping surface of pole piece 22 with the surface of pole piece 22 which is parallel to surface 14 of medium 17. By knowing the angle of the sloping surface, the location of intersection 26, which is clearly visible by virtue of being a break in the contour, in a plane parallel to surface 14 of medium 17 serves as an indication of how far beyond the lower surface of pole piece 23 pole piece 22 ends at the gap. This indication is determined from the distance $x$ between intersection 26 and the end of pole piece 22 at the gap, and may be expressed as $y=x \tan \alpha$, where $y$ represents the vertical distance between the lower or outermost surface of pole piece 23 and the end of the lower or outermost surface of pole piece 22 at the gap. By utilizing this relationship, the head may be very accurately lapped so that conventional production techniques can be used to produce magnetic transducer heads having precisely determined response characteristics.

In FIG. 3, a side view of a magnetic transducer head 30 is shown, together with coil 25 wound thereon. A nonmagnetic gap 31 separates a pair of pole pieces 32 and 33. Pole piece 33, the trailing pole piece, is of conventional configuration. However, pole piece 32, the leading pole piece, is stepped back from surface 14 of recording medium 17 in order to accomplish the objectives described in conjunction with head 20 of FIG. 2. Thus, flux arising from magnetic recording medium 17 has much less effect on pole piece 32 than on pole piece 33 because of the greater spacing between medium 17 and pole piece 32 than between medium 17 and pole piece 33. Thus, while the area of pole piece 32 which forms one end of gap 31 is less than the area of pole piece 33 which forms the other end of the gap, it nevertheless is sufficient to permit passage of magnetic flux through coil 25 and to allow efficient generation of a magnetic field for writing on medium 17.

FIG. 4 is a side view of still another embodiment of a transducer head 40 of the instant invention together with output coil 25 wound thereon, showing application of a leading pole piece 42, which is curved, and a conventionally shaped trailing pole piece 43, separated by a nonmagnetic gap 31. This transducer head accomplishes objectives similar to those accomplished by the transducer heads illustrated in FIGS. 2 and 3, for reasons similar to those previously stated.

FIG. 5 is a sectional view of a magnetic transducer head 50 which, in side view, is of identical configuration to that illustrated in FIG. 1B; however, when viewing the bottom of the head in a manner comparable to the view along line *cc*, as shown for head 10 of FIG. 1B, a nonmagnetic gap 51 is seen to be situated between a conventionally shaped pole piece 53, comprising the trailing pole piece for a direction of travel of the recording medium as indicated by the arrow, and a specially shaped pole piece 52, comprising the leading pole piece. In this embodiment, the inner laminations in the trailing pole piece region have a wider nonmagnetic gap than the laminations at the sides. Therefore, while the flux paths between pole pieces 52 and 53 in the laminations at either side of the head would tend to act as two discontinuities in the magnetic properties of the transducer, the varying sizes of the inner laminations result in pole piece 52 having a surface at one end of gap 51 which is not parallel to the surface of pole piece 53 at the opposite end of the gap. The effect of this surface, therefore, is to spread the response arising from each flux reversal caused by the recording medium over a longer period of time on leading pole piece 52 than on trailing pole piece 53. This effectively softens or minimizes the discontinuity in magnetic properties of the head which would other wise be added by leading pole piece 52, and the effect, again, is like that described in conjunction with the heads of FIGS. 2—4, and for similar reasons. The existence of only one discontinuity in the magnetic properties of head 50 therefore renders the head responsive to magnetization of the recording medium substantially at one edge of the gap only, thereby eliminating gap length as a limitation on head resolution. The configuration of transducer head 50 provides an additional advantage in that, when the surface adjacent the surface of the recording medium is machined or lapped, the geometric configurations of the pole piece surfaces of each end of the gap are not at all affected, minimizing any effects upon the operating characteristics of the transducer head itself.

FIG. 6 is a side view of yet another embodiment of the transducer head of the instant invention, with coil 25 wound thereon. In this embodiment, each unitary lamination 65 of head 60 comprises a low resistivity magnetic member 66, such as permalloy, and a high resistivity magnetic member 67, such as a ferrite. Thus, in the low resistivity material, currents are readily induced as a result of the changing magnetic field threading member 66 due to motion of magnetic recording medium 17 in the direction of the arrow, past leading pole piece 62 toward trailing pole piece 63 on the other side of nonmagnetic gap 61. In this embodiment, the magnetic fields created by the currents induced in low resistivity member 66, which is typically welded to high resistivity member 67 at interface 68, is not matched by corresponding current induced in member 67, due to the high resistivity of member 67, The effect of the induced currents in member 66 is to create a magnetic field which acts to distort the distribution of flux passing through pole piece 62 from recording medium 17, rendering the time dependence of the flux in pickup coil 25 less rapid for flux entering the surface of pole piece 62 in comparison with the flux entering pole piece 63. Again, therefore, the magnetic discontinuity which is present at trailing pole piece 63 is substantially not present at leading pole piece 62, and the effect on output voltage produced by coil 25 is similar to that described for the effect on output voltage produced by the transducer head embodiments illustrated in FIGS. 2—5. To still further minimize any discontinuity in the magnetic properties of transducer head 60 at pole piece 62, each lamination of member 66 may be made thicker than each lamination of member 67, with less laminations being used in member 66 than in member 67 so as to maintain a uniform thickness for the transducer head.

Figure 7:
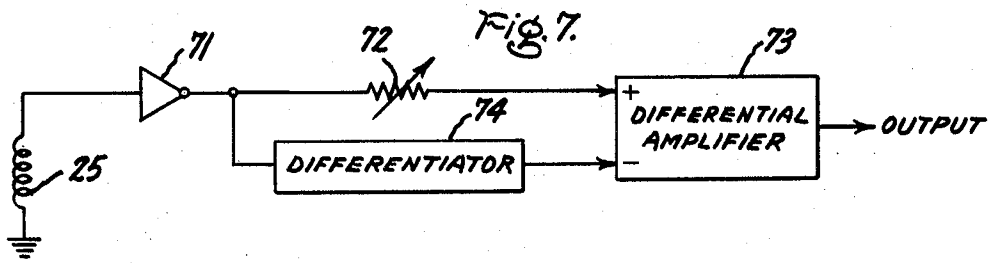
FIG. 7 is a diagram of one embodiment of apparatus useful in providing electrical output pulses from the transducer head of the invention.

In FIG. 7, a filter for producing useful electrical output signals from coil 25 on any one of the transducer heads illustrated in FIGS. 2—6 is shown. Voltages induced in coil 25, which is wound about the laminations of the head (not shown), are furnished conveniently through an amplifier 71 and an adjustable resistance 72 to the minuend input terminal (+) of a differential amplifier 73. In addition, the output signal of amplifier 71 is differentiated once, with respect to time, in a differentiator circuit 74, the output signal of which is furnished to the subtrahend input terminal (−) of differential amplifier 73. Thus, the output signal of differential amplifier 73 represents the output signal of coil 12 less the time derivative of the output signal of coil 12.

Figures 8A, 8B, 8C:
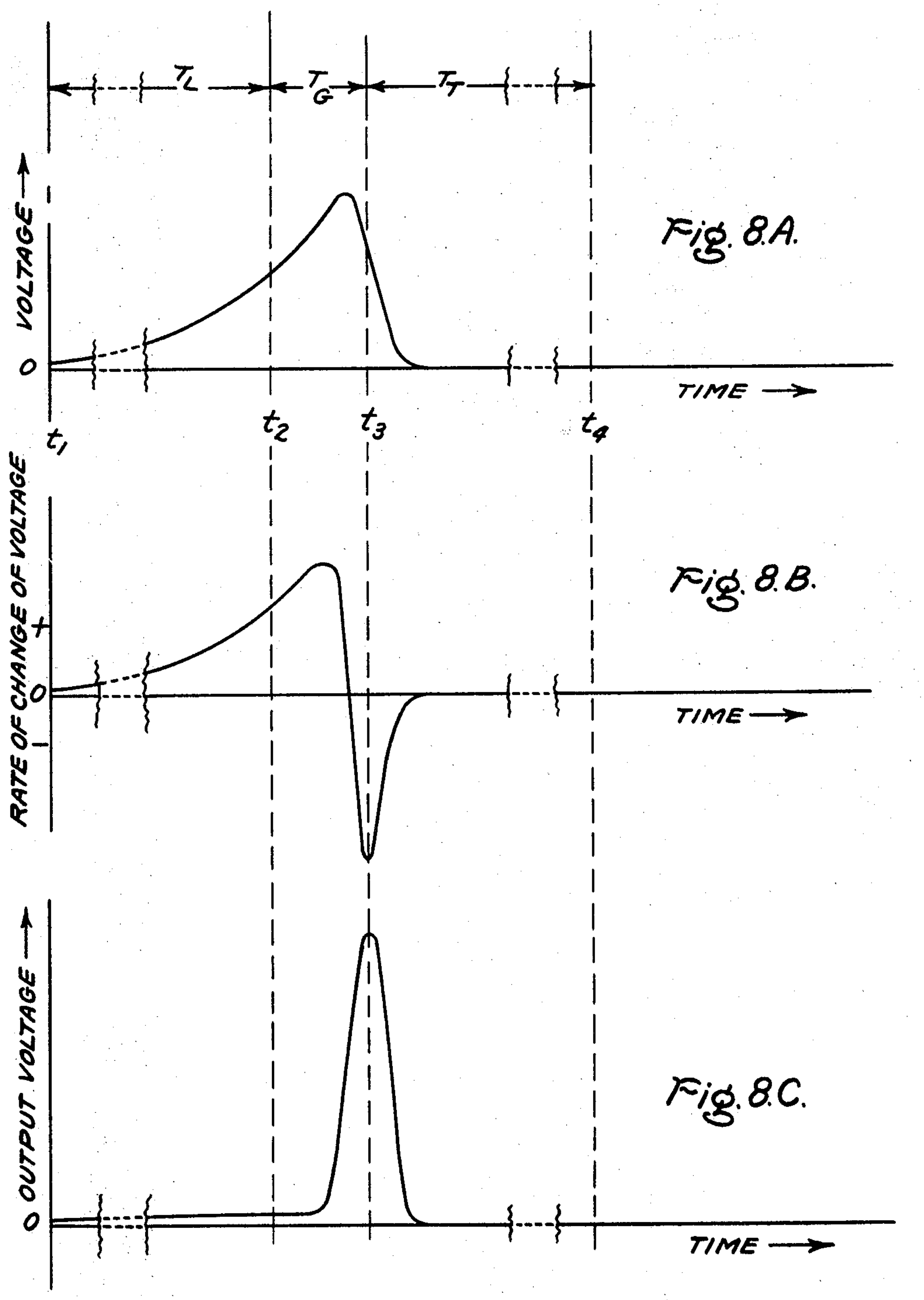
FIGS. 8A—8C are graphical illustrations to aid in describing operation of the apparatus shown in FIG. 7.

Operation of the circuit of FIG. 7 may be readily understood by reference to FIGS. 8A—8C. FIG. 8A is a graphical representation with respect to time of the output voltage produced by coil 25 wound on a transducer head of the type illustrated in any of FIGS. 2—6, which results when a pulse recorded on magnetic recording medium 17 passes in relation to the head and its opposed pole pieces. Time $T_L$ represents the length of time required for the flux reversal to traverse the leading pole piece, time $G_G$ represents the time for the flux reversal to traverse the length of the gap between the leading and trailing pole pieces, and time $T_T$ represents the time required for the flux reversal to traverse the trailing pole piece. On a time scale, these successive intervals occur between times $t_1$ and $t_2$, $t_2$ and $t_3$, and $t_3$ and $t_4$, respectively, with times $T_L$ and $T_T$ shown shortened in order to emphasize the output voltage waveform when the flux reversal is in the transition region of either pole piece, or the region therein which is close to the gap. From the voltage curve of FIG. 8A, it is evident that the recorded reversal of magnetization produces a rising voltage wave as it passes beneath the leading pole piece, and continues to produce a rising voltage wave as it traverses the length of the gap. However, as the pulse approaches very closely to the end of the gap and the beginning of the trailing pole piece, this voltage wave begins to fall sharply, until the flux reversal has progressed beneath the trailing pole piece. At this time, the voltage induced in output coil 25 of the transducer head tapers off relatively quickly to zero. As the magnetic flux linking the pickup coil in the transducer head drops abruptly to zero, the voltage induced in coil 12 similarly drops abruptly to zero. This drop in voltage is sufficiently rapid, compared to the rise time, so that it can be considered a straight line, as shown in FIG. 8A.

FIG. 8B illustrates the output signal of differentiator 74 resulting from an input signal applied thereto of the type illustrated in FIG. 8A. Thus, the output signal of differentiator circuit 74, being the first derivative with respect to time of the voltage waveform of FIG. 8A, approximates the substantially exponential rise of the voltage wave in FIG. 8A; however, the amplitude of the exponential voltage wave of FIG. 8B is maintained at all times substantially equal to that of the exponential voltage wave of FIG. 8A. A polarity reversal occurs in the output voltage of differentiator circuit 74 when the slope of the output voltage of coil 12 reverses. The output voltage of differentiator circuit 74 ultimately returns to zero as the slope of the voltage wave in FIG. 8A returns to zero.

By subtracting the voltage waveform of FIG. 8B from the voltage waveform of FIG. 8A, an output voltage of waveform illustrated in FIG. 8C is produced by differential amplifier 73. It can be seen that voltage cancellation is essentially perfect over almost the entire time interval in which output voltage from coil 12 was building up. This cancellation is controlled by resistance 72 which is adjusted to maintain the positive amplitude of the output voltage waveform from differentiator 74 very close to the positive output voltage amplitude of amplifier 71, so that the output voltage of differential amplifier 73 produced while the recorded pulse is sensed by the leading pole piece is as close to zero as possible throughout this interval. The output voltage pulse produced by amplifier 73 is nonzero only during the relatively short dropoff interval of the voltage wave of FIG. 8A. Thus, the pulse recorded in the magnetic recording medium is reproduced as a single sharp voltage pulse whose duration is comparable to the fall time of the original pulse.

With conventional production techniques, the rising portion of the voltage wave of FIG. 8A only approximates an exponential function, while the falling portion of the waveform in FIG. 8A is only approximately linear. Because these voltage shapes are not precisely exponential and linear respectively, a small amount of baseline shift may occur. This baseline shift can be regarded as distortion in the low frequency components of the response function. For information storage systems of high density, however, the low frequency components are relatively unimportant. They may easily be filtered by conventional techniques if they should be considered bothersome.

Figure 9:
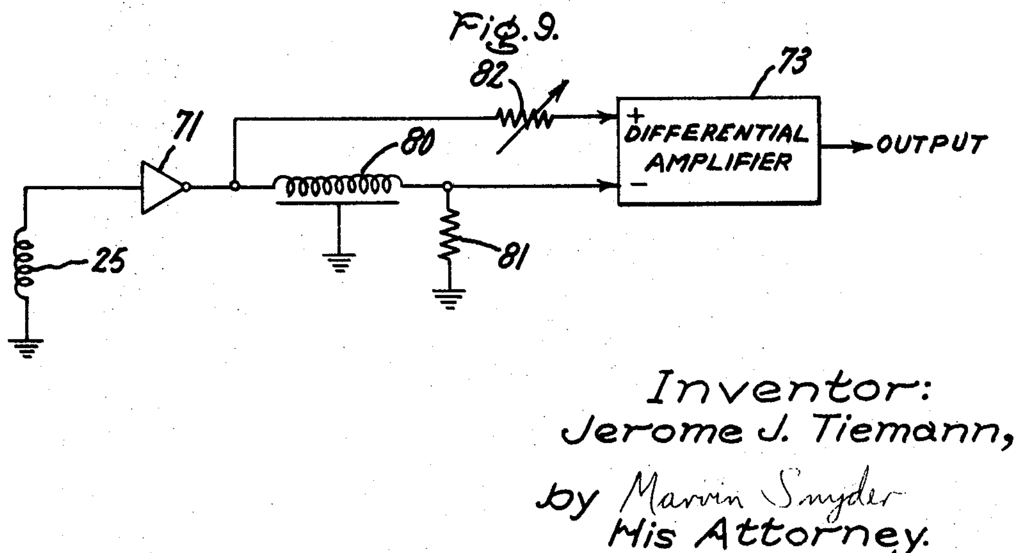
FIG. 9 is a diagram of a second embodiment of apparatus useful in providing electrical output pulses from the transducer head of the invention.

FIG. 9 represents another embodiment of filter apparatus for producing useful output signals from any one of the magnetic transducer heads illustrated in FIGS. 2—6. In this embodiment, output signals from amplifier 71 are furnished from coil 25, which is wound about the laminations of the head (not shown), to one end of a delay line 80, the opposite end of which is grounded through a resistance 81. Output signals from the opposite end of delay line 80 are furnished directly to the subtrahend input terminal (−) of differential amplifier 73. In addition, output signals from amplifier 71 are furnished through a variable resistance 82 to the minuend input terminal (+) of differential amplifier 73.

If minimum time spacing of pulses in the recording medium as the medium is moved in relation to the transducer head be of duration Δ, the delay introduced by the delay line is made equal to Δ. Accordingly, if the input signal to delay line 80 be represented by $f(t)$, the output signal of delay line 80 may be represented by $f(t-\Delta)$. The output signal of differential amplifier 73 may be designated $f_1(t)$. Thus, the output signal produced by differential amplifier 73 wherein the subtrahend signal is subtracted from the minuend signal may be written $$f_1(t)=k[f(t)]-f(t-\Delta),$$

where $K$ represents a weighting factor introduced by the ohmic value of resistance 82. This weighting factor is necessarily less than 1, so that the output signal produced by differential amplifier 73 may be written $$f_1(t)=(1k)f-F(t-\Delta)$$

$$=[f(t)-f(t-\Delta)]-kf(t),$$

where $k=1-K$. The latter expression for $f_1(t)$ is seen to be represented by the difference between the first derivative of the input signal from coil 25, represented approximately by the expression $[f(t)-f(t-\Delta)]$, and a fractional portion of the input signal from coil 25, represented by the expression $kf(t)$. Accordingly, the output signal produced by differential amplifier 73 in response to a single recorded pulse may be represented by a waveform substantially identical to that illustrated in FIG. 8C.

The foregoing describes a magnetic transducer head having very high resolution which is independent of gap length, By virtue of the relatively large gap length, the recording head can have a very low inductance and a strong recording field without suffering loss of extremely fine resolution. By employing essentially only one sharp discontinuity in magnetic properties of the head at the edge of the gap, magnetic flux threading the head in the vicinity of the discontinuity may be very effectively sensed. In addition, linear signal processing apparatus is provided for use with the high resolution magnetic recording head of the instant invention. Since only linear operations are employed, the response to even a very complicated magnetization pattern is readily obtained by superposing the responses due to the individual flux reversals.

While only certain preferred features of the invention have been shown by way of illustration, many modifications and changes will occur to those skilled in the art. It is, therefore, to be understood that the appended claims are intended to cover all such modifications and changes as fall within the true spirit and scope of the invention.

I claim:

1. Apparatus for detecting signals magnetically recorded on a recording medium, said apparatus comprising:

first and second members of high permeability magnetic material defining a nonmagnetic gap between said members, said first and second members being situated in unequal proximity to said recording medium and movable in relation thereto so that the time rate of change of magnetic flux due to a magnetic flux reversal arising as said medium moves in relation thereto is more gradual in said first member when said flux reversal is at its closest point to the edge of said first member at said gap than the time rate of change of magnetic flux in said second member when said flux reversal is at its closest point to the edge of said second member at said gap; a crosspiece of high permeability magnetic material integrally joined to said first and second members; a coil of wire wound about at least a portion of the magnetic material of said transducer head; the unequal proximity of said first and second pole pieces relative to said recording medium producing a nonsymmetrical variation in output voltage from said coil with time for a sensing of a given flux reversal by said pole pieces; and filter means coupled to said coil of wire for reproducing the recorded signals electrically to a high degree of accuracy; said filter means including means coupled to the output of said coil of wire for amplifying the output signal therefrom, means for generating a signal having an amplitude corresponding substantially to the output from said amplifying means during the interval when a flux reversal on said recording medium is closest to said first member to produce a gradual change in coil output voltage with time and means for substracting the output signal of said generating means from the output signal of said amplifying means to produce a difference signal having a peak amplitude during the interval when a flux reversal on said recording means is closest to said second member to produce a rapid change in coil output voltage with time.

2. The apparatus of claim 1 wherein said filter means comprises: a differential amplifier having a pair of inputs for subtracting one applied input signal from another applied input signal; a differentiator circuit; means coupling said coil jointly to one input of said differential amplifier and the input of said differentiator circuit; and means coupling the output of said differentiator circuit to the other input of said differential amplifier.

3. The apparatus of claim 2 wherein said means coupling said coil jointly to one input of said differential amplifier and the input of said differentiator circuit includes a variable resistance in series with said one input of said differential amplifier.

4. The apparatus of claim 1 wherein said filter means comprises: a differential amplifier having a pair of inputs for subtracting one applied input signal from another applied input signal; a delay line; means coupling said coil jointly to one input of said differential amplifier and to one end of said delay line; and means coupling the other end of said delay line to the other input of said differential amplifier.

5. The apparatus of claim 4 wherein said means coupling said coil jointly to one input of said differential amplifier and to one end of said delay line includes a variable resistance in series with said one input of said differential amplifier.

6. The apparatus of claim 1 wherein the lower face of said second member situated adjacent said recording medium is disposed substantially parallel to the plane of said recording medium and terminates at said gap in a substantially orthogonal attitude relative to the face of said second member forming said nonmagnetic gap therebetween and the lower face of said first member adjacent said recording medium gradually increases in span from said recording medium with increased proximity of said first member to said second member to establish a gradual interface between said nonmagnetic gap and said first member relative to the interface between said nonmagnetic gap and second second member, said apparatus being further characterized by a span across said nonmagnetic gap measured in a plane parallel to the plane of said recording medium which span decreases with increased departure from said recording medium.

7. A magnetic transducer head for use with a magnetic recording medium movable in relation thereto, said transducer head comprising first and second pole pieces of high permeability magnetic material defining a nonmagnetic gap therebetween, the lower face of said second pole piece situated adjacent said recording medium being disposed substantially parallel to the plane of said recording medium and terminating at said nonmagnetic gap in a substantially orthogonal attitude relative to the face of said second pole piece forming said nonmagnetic gap therebetween to produce a rapid time rate of change of magnetic flux in said transducer head when a flux reversal passes below the orthogonal edge of said second pole piece adjacent said gap, the lower surface of said first pole piece being characterized by a lower face adjacent said recording medium having a gradually increasing span from said recording medium with increased proximity of said first pole piece to said second pole piece to establish a gradual interface between said nonmagnetic gap and said first pole piece relative to the interface between said trailing pole piece and said nonmagnetic gap, said transducer head having a span across said nonmagnetic gap measured in a plane parallel to the plane of said recording medium which span decreases with departure from said recording medium, a crosspiece of high permeability magnetic material integrally joined to said leading and trailing pole pieces and a coil wire wound about at least a portion of the magnetic material of said transducer head.

8. A magnetic transducer head according to claim 7 wherein the lower surface of said first pole piece exhibits a linear increase in span from said recording medium with increased proximity to said second pole piece.

9. A magnetic transducer head according to claim 8 wherein said first pole piece exhibits a sharp break in contour at the location where said lower face of said pole piece begins to linearly depart from said recording medium, said lower face of said second pole piece and said alteration in contour of said first pole piece being disposed in a common plane parallel to the surface of said recording medium.

10. A magnetic transducer head according to claim 7 wherein the lower surface of said first pole piece exhibits an arcuate increase in span from said magnetic medium with increased proximity to said second pole piece.

11. An apparatus for detecting signals magnetically recorded on a recording medium comprising a magnetic transducer head according to claim 7 and further including means coupled to the output of said coil of wire for amplifying the output signal therefrom, means for generating a signal having an amplitude corresponding substantially to the output from said amplifying means during the interval when a flux reversal on said recording medium is closest to said first pole piece to produce a gradual change in coil output voltage with time and means for substracting the output signal of said generating means from the output signal of said amplifying means to produce a difference signal having a peak amplitude during the interval when a flux reversal on said recording means is closest to said second pole piece to produce a rapid change in coil output voltage with time.